United States Patent [19]
Ferguson

[11] Patent Number: 5,661,527
[45] Date of Patent: Aug. 26, 1997

[54] AUTOMATIC VIDEO SIGNAL IDENTIFICATION

[75] Inventor: Kevin M. Ferguson, Beaverton, Oreg.

[73] Assignee: Tektronix, Inc., Wilsonville, Oreg.

[21] Appl. No.: 499,539

[22] Filed: Jul. 7, 1995

[51] Int. Cl.⁶ .................................................. H04N 5/46
[52] U.S. Cl. ............................................ 348/558; 348/554
[58] Field of Search ............................. 348/179, 180,
348/189, 129, 130, 177, 554, 555, 556,
557, 558; 382/209, 217, 218, 278; H04N 17/00,
5/46, 3/27

[56] References Cited

U.S. PATENT DOCUMENTS

| | | | |
|---|---|---|---|
| 4,969,041 | 11/1990 | O'Grady et al. | 358/142 |
| 5,014,327 | 5/1991 | Potter et al. | 382/220 |
| 5,067,162 | 11/1991 | Driscoll, Jr. et al. | 382/278 |
| 5,159,644 | 10/1992 | Martin et al. | 382/161 |
| 5,166,781 | 11/1992 | Walby et al. | 348/558 |
| 5,214,716 | 5/1993 | Refregier et al. | 382/278 |
| 5,398,071 | 3/1995 | Gove et al. | 348/558 |
| 5,444,491 | 8/1995 | Lim | 348/558 |
| 5,457,499 | 10/1995 | Lim | 348/558 |

OTHER PUBLICATIONS

"Modern Digital and Analog Communication Systems" Second Edition B.P. Lathi, California State University, Sacramento, Holt, Rinehart and Winston, Inc.

Primary Examiner—John K. Peng
Assistant Examiner—Jeffrey S. Murrell
Attorney, Agent, or Firm—Francis I. Gray

[57] ABSTRACT

An automatic video signal identification system uses zero-mean normalized reference signals that are cross-correlated with an input video signal. The input video signal is stored in an acquisition memory and then cross-correlated with a plurality of reference signal templates, each template representing a particular video signal to be identified. The cross-correlation process provides a corresponding plurality of maximum correlation outputs. The largest maximum correlation output is determined, and the corresponding template identified. If not already normalized, the largest maximum correlation output is normalized to produce a correlation coefficient. Based upon the identified template the correlation coefficient is tested to determine the validity of the match, i.e., whether the video signal is identified or whether the video signal is unknown. The resulting match ID is then converted into a code which is used to steer video signal measurements for the identified video signal and/or into a text label for display. The reference signal templates may be preloaded or captured from the input signal, making the system adaptable for identifying additional video signals.

17 Claims, 2 Drawing Sheets

AUTOMATIC VIDEO SIGNAL IDENTIFICATION

BACKGROUND OF THE INVENTION

The present invention relates to digital signal processing, and more particularly to automatic video signal identification for video test, for assurance of data present, or for generally translating a video waveform into a code to steer an appropriate measurement and/or an identifying text label.

Video signal detection involves many specific filters for feature extraction, including edge detection, chrominance demodulation and signal level detection, at various time intervals in a video horizontal line. To optimize this method it is necessary to optimize both each feature filter and the weighing and/or the thresholding of the combination of the outputs of these filters for each signal to be identified. Implementation involves manually determining which filters should be used, where, and with what weightings and threshold for each signal to be identified. An example of this method is incorporated into the VM700 Video Measurement Test Set manufactured by Tektronix, Inc. of Wilsonville, Ore., United States of America.

Optimal signal detection, as described in Chapter 7 of "Modern Digital and Analog Communication Systems" 2d Ed. by B. P. Lathi published by Holt, Rinehart and Winston, Inc. (1989), uses cross-correlation, or equivalent matched filters, selection of maximum filter output, and a threshold to decide if a signal is present or not. The signal to be detected is either cross-correlated with a plurality of reference signals or is filtered using a plurality of matched filters, each designed with the time-reversed form of a corresponding one of the reference signals as its impulse response. This method was developed primarily to distinguish among signals which have a known amplitude and DC offset. This does not apply directly to identifying video signals because, while the gain of the synchronizing signal or color sub-carrier frequency may be set using an automatic gain control circuit and the DC offset of the back porch may be controlled with a clamp circuit, the various spectral and temporal components of the video are not always known relative to sync and burst. Also this method is very sensitive to changes in pedestal level, i.e., DC offset from back porch, on which other video may be added.

What is desired is a method of automatic video signal identification that is simple and robust while being adaptable.

SUMMARY OF THE INVENTION

Accordingly the present invention provides an automatic video signal identification technique using zero-mean normalized reference signals that are cross-correlated with an input video signal. The input video signal is applied to the equivalent of a plurality of matched filters, each filter corresponding to a separate one of a plurality of time-reversed reference signals as its impulse response. The maximum correlation output of each filter is captured, equivalent to having a peak-hold circuit at the output of each filter. The largest of the correlation outputs from the peak-hold circuits corresponds to the best match from all the reference signals. The best match correlation output is normalized by the energy of the input video signal to produce a correlation coefficient, which is compared to a threshold for a binary decision of whether the signal is identified or not.

The objects, advantages and novel features of the present invention are apparent from the following detailed description when read in conjunction with the appended claims and attached drawing figures.

DESCRIPTION OF THE PREFERRED EMBODIMENT

Figure 1:
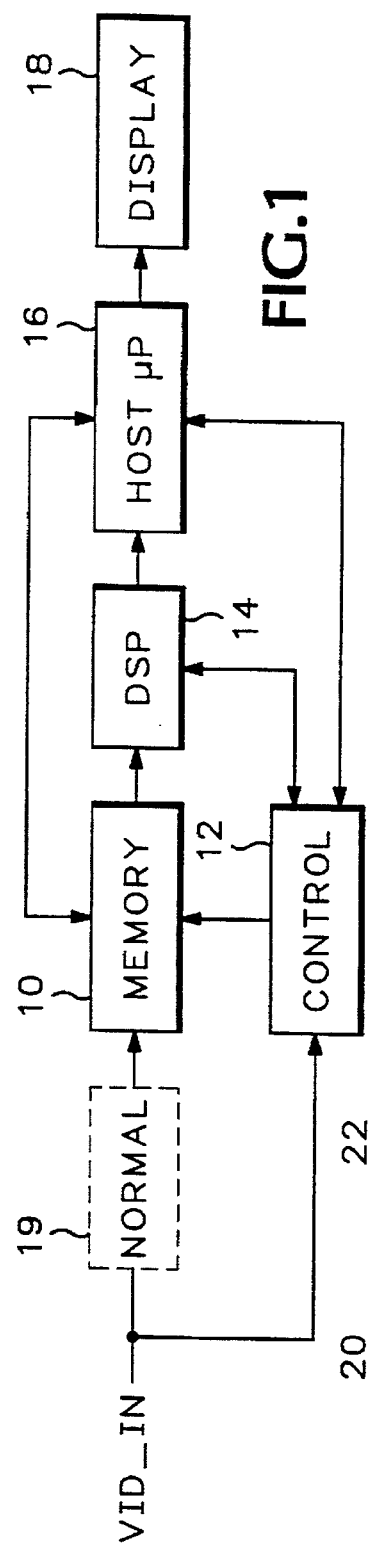
FIG. 1 is a block diagram view of an automatic video signal identification system according to the present invention.

Referring now to FIG. 1 a video signal VID_IN which has been digitized is acquired and stored in an acquisition memory 10. For example, in NTSC for video identification test signals (VITS), which are stored in the vertical interval of a video signal, only lines 9–22 of each field of the video signal needs to be stored. However the number and location of lines to be stored depends upon the format of the input video signal as well as the type of video signal for which identification is desired. The acquisition memory 10 may also include templates of various video patterns or reference signals corresponding to the desired video identifications, such as color bars, FCC composite, pedestal, teletext, etc. VID_IN also is applied to a control circuit 12, which generates appropriate control and clock signals from the sync information of VID_IN. Control signals from the control circuit 12 are used to store the desired portion of VID_IN in the acquisition memory 10, as is well known in the art.

Data from the acquisition memory 10 is transferred to a digital signal processor (DSP) 14 for processing, as is described below. The result of the processing is an identification code and a normalized correlation coefficient which is output to a host processor 16 for final processing. The output of the host processor 16 is a code, which may be used for steering subsequent video measurements of the input video signal, or a text label for display on a display device 18 which identifies the video signal. The bus arbitration and control signals for the DSP 14 and host processor 16 are generated as control signals by the control circuit 12. The host processor 16 also may be used to acquire video signals as reference signals by storing an acquired signal as a template. In this way the system is adaptable for identifying additional video signals as desired.

Figure 2:
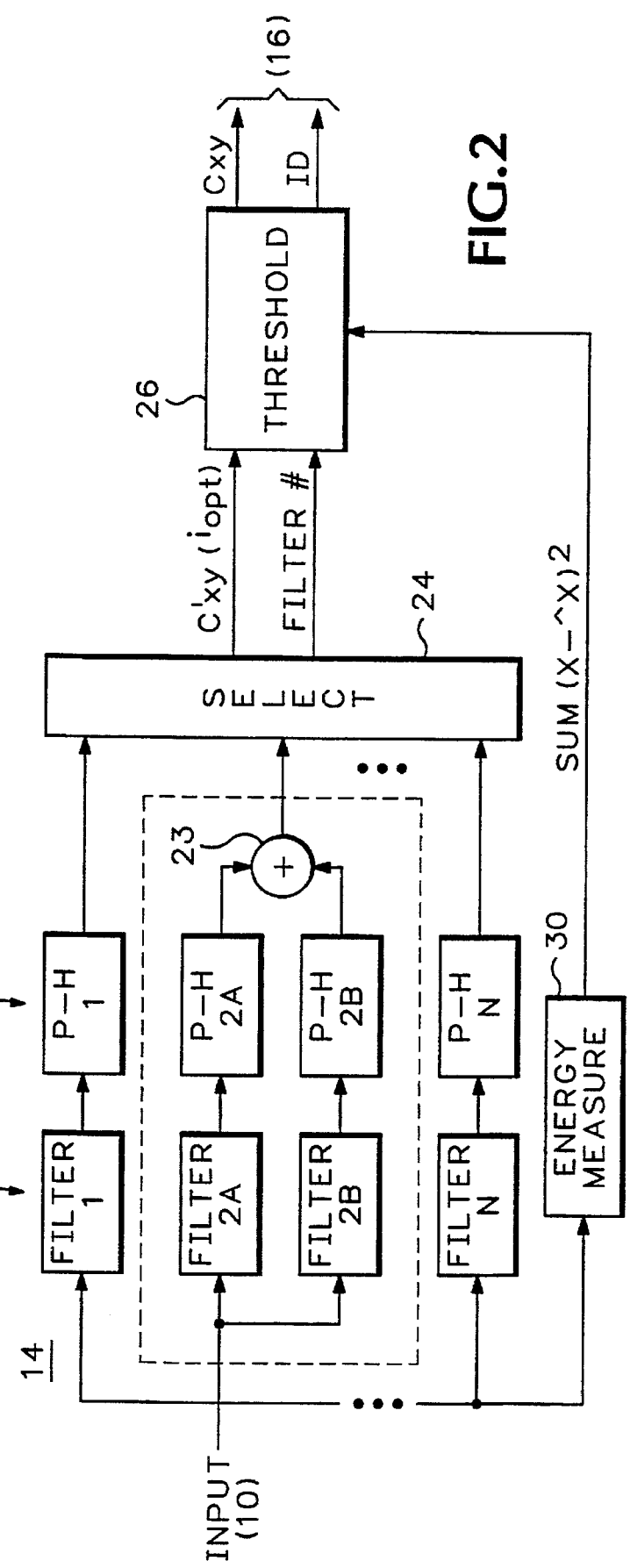
FIG. 2 is a block diagram view of a digital signal processor for the automatic video signal identification system according to the present invention.

The DSP 14 is shown in greater detail in FIG. 2. The portion of the input video signal stored in the acquisition memory 10 is applied to a plurality of matched filters 20, each matched filter corresponding to a time-reversed reference signal as its impulse response with the reference signal energy being normalized to be equal to one. The reference signals correspond to those video signals for which identification is desired. A peak-hold circuit 22 at the output of each matched filter 20 captures the maximum correlation output for each filter. The matched filter and peak-hold circuit combination provides a cross-correlation between the input signal and each reference signal or template. Where the template has multiple features for a video signal, then multiple feature filters 2A, 2B may be used together with associated peak-hold circuits 2A, 2B and a combination circuit 23 to provide a composite maximum correlation output. The maximum correlation outputs, or unnormalized correlation coefficients, from the peak-hold circuits 22 are input to a selector 24 which outputs an identification of the filter 20 with the largest maximum correlation output as well as an associated unnormalized correlation coefficient C'xy(iopt). A qualification circuit 26 compares the optimum maximum correlation output, representative of the best match with the templates, with a settable threshold to determine whether the indicated match is valid for the identified filter 20. The threshold is set according to the filter 20 which produces the optimum maximum correlation output. The qualification circuit 26 provides an identification code ID, indicating which reference signal was matched or that there was no match. The qualification circuit 26 may also normalize the unnormalized correlation coefficient, if normalization has not already occurred earlier in the processing chain, prior to thresholding. This normalization is achieved by processing the input video signal with an energy measurement circuit 30, then dividing the unnormalized correlation coefficient by the measured energy to produce the correlation coefficient Cxy representative of the best match with the templates. The identification code together with the normalized correlation coefficient Cxy is input to the host processor 16 for final processing and display. Normalization may occur at any point in the DSP 14 processing chain, such as by adjusting the gain at the input by optional normalization circuit 19 to normalize VID_IN in which case the energy measurement circuit 30 is not required and the outputs of the cross-correlations input to the selector 24 are normalized correlation coefficients, so that the thresholding in the qualification circuit 26 identifies a "good" match.

Figure 3:
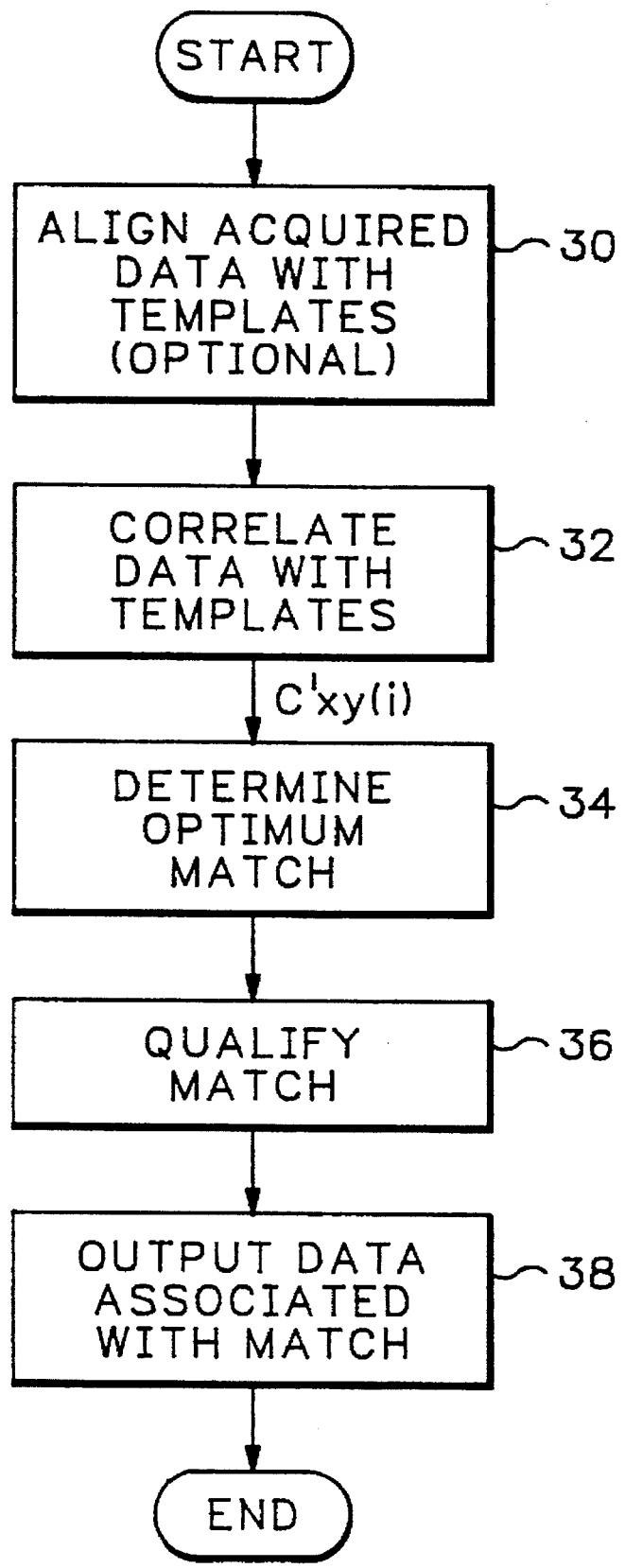
FIG. 3 is a flow chart view of an automatic video signal identification algorithm according to the present invention.

The DSP 14 algorithm may be charted as shown in FIG. 3. The first step 30 aligns the data from the acquisition memory 10 with the templates or reference signals. This may be achieved by finding the first peak of the burst portion of the data which is used to line up the input signal with the template signals, or the leading edge of sync where burst is not available. This alignment step, although not essential, improves processing speed by reducing the range of integration in the following correlation step. After alignment, if performed, cross-correlation with the set of reference signals is performed at step 32, obtaining a set of maximum correlation outputs C'xy(i). The maximum correlation output for each template occurs at the optimum match step 34. The normalized correlation coefficient for each reference signal is given by:

$$Cxy(i) = sum(X - \hat{X}) * Y(i) / SQRT\{(sum((X - \hat{X}) * (X - \hat{X})) * (sum(Y(i) * Y(i))\}$$

where $\hat{Y}(i)=0$ (mean=0) and $\hat{X}$ is the mean, i.e., DC component, of the input video signal. The $sum((X-\hat{X})2)$ term represents the energy of the input signal, the $sum(Y(i)2)$ term represents the energy of each reference signal, and the $sum((X-\hat{X})*Y(i))$ term represents the cross-energy between the input and reference signals. However for finding the maximum correlation output, the $sum((X-\hat{X})**2)$ term under the square root may be set=1 since this factor is common to all Cxy(i) being compared. Also since Y is zero mean, the term $sum(\hat{X})*Y=0$. Therefore the term sum (Y(i)*Y(i)) may be pre-computed as Ysd(i), the energy of the templates, and its inverse Zsd(i) may be used to multiply instead of divide. For normalized matched filters 20 the value of Zsd(i) equals 1.

$$C'xy(i) = sum(X) * Y(i) * Zsd(i)$$

The maximum C'xy(i) is output by the selector 24 as C'xy(iopt).

Finally to qualify the best match as an actual match the square of the unnormalized correlation coefficient is computed by calculating the energy of the input signal:

$$(sum(X-\hat{X})*(X-\hat{X}))$$

and dividing it into C'xy(iopt)**2:

$$Csy2 = (C'xy(iopt)2)/(sum(X-\hat{X})*(X-\hat{X}))$$

Therefore in summary (1) find the start of burst for offset into the data record to compute C'xy(i), or find sync if no burst; (2) compute $sum(X*Y(i))*Zsd(i)$ and store running maximum correlation outputs and their locations; (3) determine the maximum correlation output and its location; (4) calculate the correlation coefficient by dividing by $(sum(X-\hat{X})*(X-\hat{X}))$; and (5) qualify the correlation coefficient according to the associated reference signal. To improve the speed of the correlation process, where high frequency is not important such as for ramp or step signals, preliminary matches may be made with lowpass mini-templates, such as looking at luminance only.

Once the largest maximum correlation output is determined, it is normalized, if not already normalized, and thresholded at step 36 to provide the normalized correlation coefficient and match ID, qualifying that the video signal is identified or that the video signal is not identified, i.e., is unknown. The match ID is used by the host processor 16 at step 38 to output the appropriate code for steering subsequent video measurements associated with the video signal and/or to output text for display corresponding to the identified match.

Thus the present invention provides for automatic video signal identification by performing a cross-correlation between an input video signal and a plurality of reference signal templates to identify which template, if any, matches the input video signal.

What is claimed is:

1. A method of identifying video signals within an input video signal comprising the steps of:
   cross-correlating the input video signal with each of a plurality of zero-mean reference signal templates to produce a set of maximum correlation outputs, each template representing an individual one of the video signals to be identified;
   selecting the largest of the maximum correlation outputs from the set as an optimum correlation output, identifying a location within the set corresponding to the optimum correlation output; and
   qualifying the optimum correlation output in the form of a correlation coefficient as a function of the location to produce an output identification code indicating the zero-mean reference signal template corresponding to the qualified optimum correlation output.

2. The method as recited in claim 1 further comprising the step of aligning the input video signal with the plurality of zero-mean reference signal templates prior to the cross-correlating step to improve processing speed.

3. The method as recited in claim 1 further comprising the step of steering a video signal measurement based upon the output identification code.

4. The method as recited in claim 1 further comprising the step of displaying a text message identifying the zero-mean reference signal template based upon the output identification code.

5. The method as recited in claim 1 further comprising the step of normalizing the input video signal prior to the cross-correlating step so that the maximum correlation outputs are respective template correlation coefficients and the optimum correlation output is the correlation coefficient.

6. The method as recited in claim 1 further comprising the step of normalizing the optimum correlation output using the input video signal to produce the correlation coefficient.

7. An apparatus for identifying video signals within an input video signal comprising:

means for cross-correlating the input video signal with each of a plurality of zero-mean reference signal templates to produce a set of maximum correlation outputs, each template representing an individual one of the video signals to be identified;

means for selecting the largest of the maximum correlation outputs from the set as an optimum correlation output, identifying a location within the set corresponding to the optimum correlation output; and means for qualifying the optimum correlation output in the form of a correlation coefficient as a function of the location to produce an output identification code indicating the zero-mean reference signal template corresponding to the qualified optimum correlation output.

8. The apparatus as recited in claim 7 further comprising means for aligning the input video signal with the plurality of zero-mean reference signal templates.

9. The apparatus as recited in claim 7 further comprising means for steering a video signal measurement based upon the output identification code.

10. The apparatus as recited in claim 7 further comprising means for displaying a text message identifying the zero-mean reference signal template based upon the output identification code.

11. The apparatus as recited in claim 7 further comprising means for normalizing the input video signal prior to the cross-correlating means so that the maximum correlation outputs are respective template correlation coefficients and the optimum correlation output is the correlation coefficient.

12. The apparatus as recited in claim 7 further comprising means for normalizing the optimum correlation output using the input video signal to produce the correlation coefficient.

13. An apparatus for automatic video signal identification comprising:

means for storing an acquired input video signal and a plurality of zero-mean reference signal templates;

means for cross-correlating the acquired input video signal with each of the templates to generate a set of maximum correlation outputs;

means for selecting the largest of the maximum correlation outputs from the set as an optimum correlation output, identifying a location within the set corresponding to the optimum correlation output; and means for qualifying the optimum correlation output as a function of the location to produce an identification code indicating the zero-mean reference signal template corresponding to the qualified optimum correlation output.

14. The apparatus as recited in claim 13 further comprising means for steering a video signal measurement as a function of the identification code.

15. The apparatus as recited in claim 13 further comprising means for displaying a text message as a function of the identification code.

16. The apparatus as recited in claim 13 further comprising means for normalizing the acquired input video signal prior to input to the cross-correlating means so that the maximum correlation outputs are respective template correlation coefficients and the optimum correlation output is the correlation coefficient.

17. The apparatus as recited in claim 13 further comprising:

means for normalizing the acquired input video signal to produce a normalized input video signal; and means for converting the optimum correlation output to the correlation coefficient as a function of the normalized input video signal.

\* \* \* \* \*